UNITED STATES PATENT OFFICE.

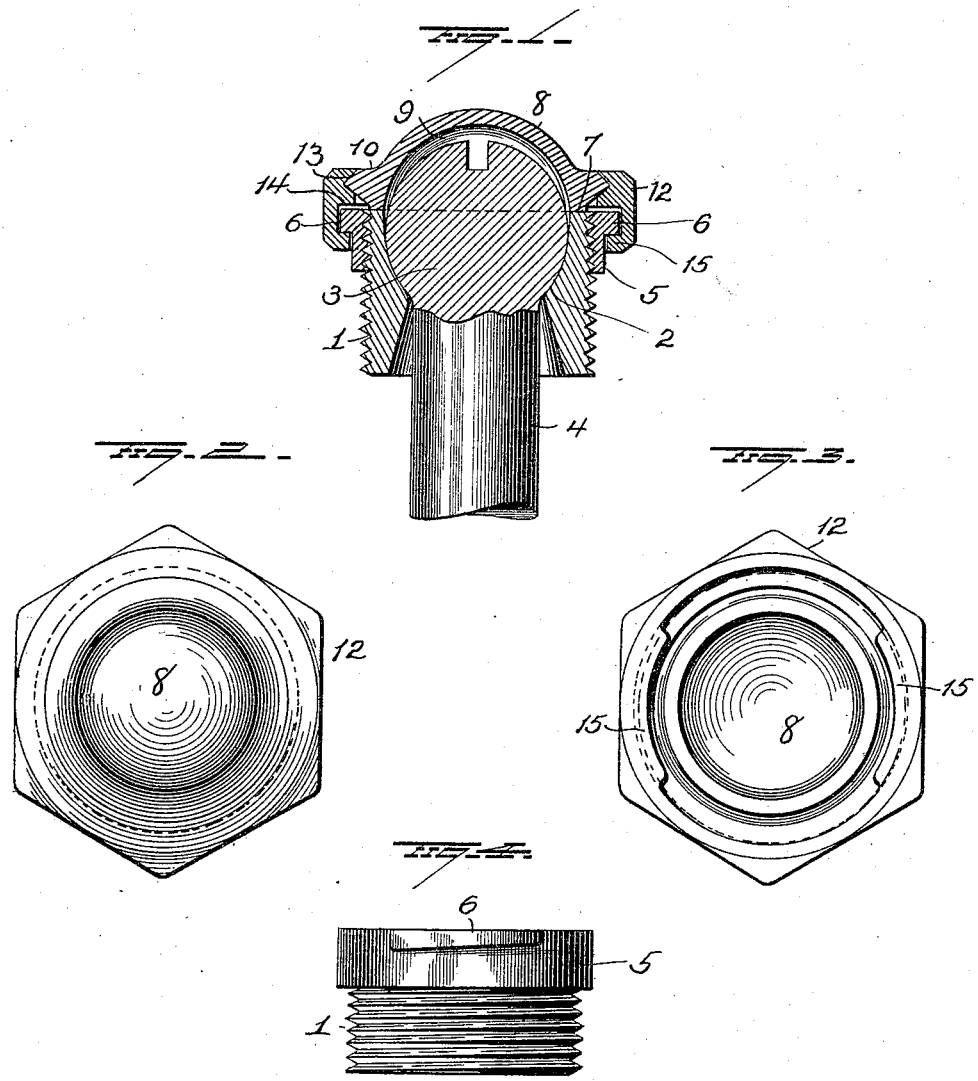

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,867.  Specification of Letters Patent.  Patented Mar. 4, 1919.

Application filed April 26, 1918. Serial No. 230,919.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers and more particularly to the means for effecting closure of the bearing sleeve,—the object of the invention being to provide simple and efficient means whereby the cap or closure for the bearing sleeve shall be securely held in place normally and yet permit the quick removal of said cap or closure to expose the head of the staybolt for testing purposes.

With this and other objects in view, the invention consists in certain novel features of construction and combinations of parts as hereinafter set forth and pointed out in the claims.

In the accompanying drawings, Figure 1 is a longitudinal sectional view of a staybolt structure embodying my improvement. Fig. 2 is a plan view; Fig. 3 is a bottom plan view with the bearing sleeve and bolt omitted, and Fig. 4 is a side view of the bearing sleeve and collar thereon.

1 represents a bearing sleeve provided interiorly with a curved face 2 which serves as a bearing for the rounded or spherical head 3 of a staybolt 4. The bearing sleeve 1 is threaded externally and receives a collar 5 having segmental shoulders 6 with beveled rear faces forming cams.

The outer end of the bearing sleeve provides a seat 7 for the edge portion of a hemispherical cap 8 and the internal dimensions and contour of said cap are such as to provide a clearance space 9 for the head of the staybolt.

The cap or closure 8 is provided with a circumferential flange or enlargement 10 having a V-shaped peripheral portion 11. A locking ring 12 encircles the annular enlargement 10 and is made interiorly with a V-shaped groove 13 in which the V-shaped peripheral portion of the annular enlargement 10 enters snugly. In assembling the cap and locking ring, the V-shaped portion of the annular enlargement 10 may be seated on the lower or inner part of the groove 13 and then the edge of the locking ring bent over to complete the V-shaped groove as shown in Fig. 1. The locking ring 12 is grooved interiorly as shown at 14 forming inwardly projecting shoulders 15 which are beveled to constitute cams,—said shoulders 15 being made segmental in form to permit the ready application of the ring 12 to the shouldered ring 5.

When the cap or closure 8 with the locking ring 12 thereon is applied to the bearing sleeve, the shoulders 13 of the locking ring sleeve will become disposed in a plane behind that of the segmental ring 6 and when the locking ring is turned, the cam shoulders 15 will move behind and engage the cam shoulders 6 and the cap will be securely locked or clamped to the bearing sleeve. It is apparent that by a limited reverse turning of the locking ring 12, the same and the cap will be unlocked from the bearing sleeve and may be quickly removed therefrom to expose the head of the staybolt for testing purposes. It is equally clear that the parts may be as quickly replaced and clamped in position on the end of the bearing sleeve.

Having fully described my invention what I claim as new and desire to secure by Letters-Patent, is:

1. In a staybolt structure, the combination with a bearing sleeve provided with a part having segmental cam shoulders, of a cap or closure to seat on said bearing sleeve and having a circumferential enlargement provided with a V-shaped peripheral portion, and a locking ring having an internal V-shaped groove receiving the V-shaped portion of the circumferential enlargement carried by the cap, said locking ring also having internal segmental cam shoulders to engage behind the cam shoulders on the bearing sleeve.

2. In a staybolt structure, the combination with a bearing sleeve having a threaded exterior portion and a ring threaded on said bearing sleeve and provided with segmental cam shoulders, of a cap to seat on the bearing sleeve and having a circumferential V-shaped portion, and a locking ring having an interior V-shaped groove receiving the circumferential V-shaped portion of the cap, said locking ring also having internal segmental cam shoulders to engage behind the cam shoulders on said first mentioned ring.

In testimony whereof, I have signed this specification in the presence of two subscribing witnesses.

ETHAN I. DODDS.

Witnesses:
S. G. NOTTINGHAM,
R. S. FERGUSON.